United States Patent Office 2,748,245
Patented May 29, 1956

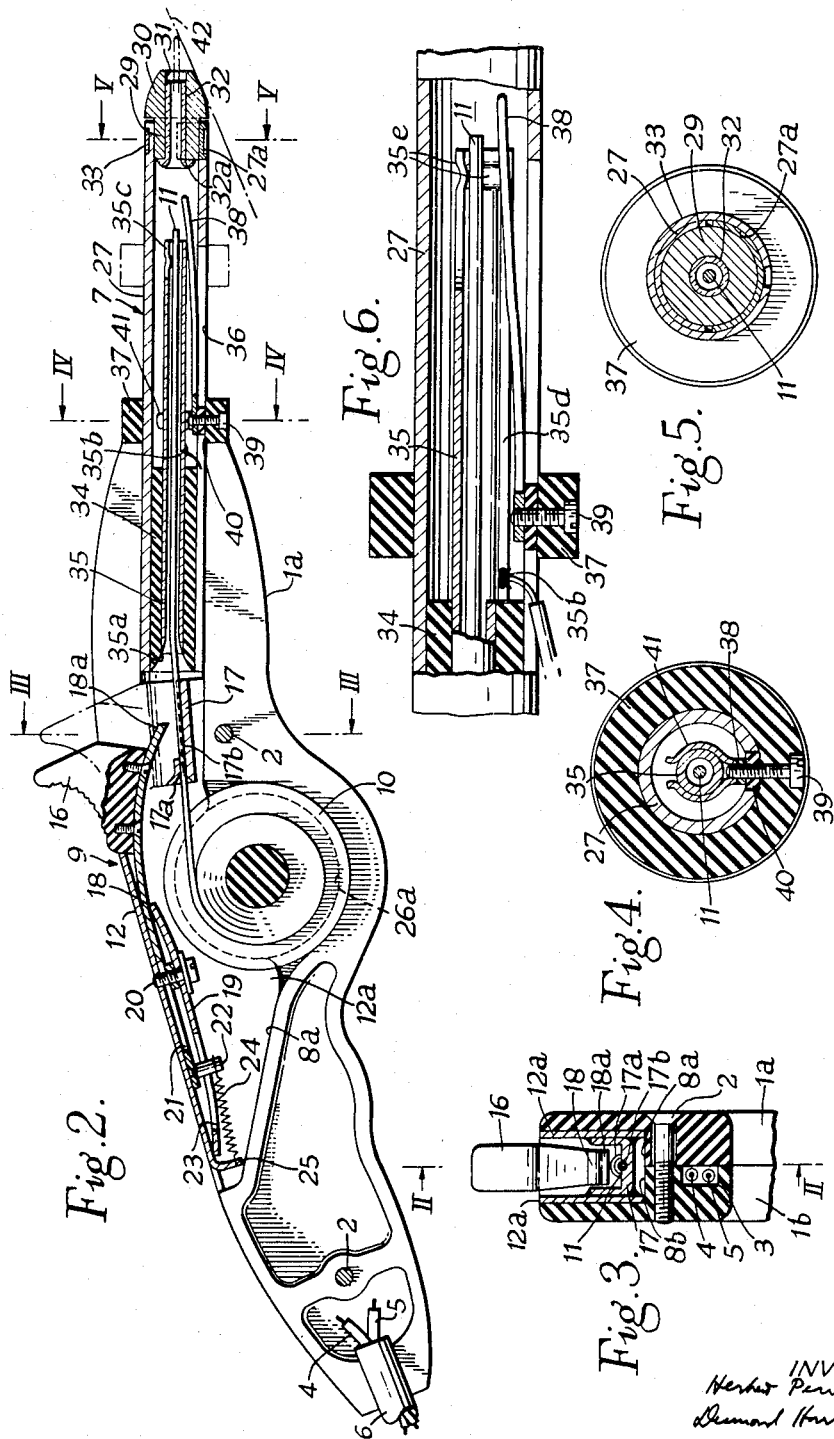

2,748,245

SOLDERING TOOLS

Herbert Pearce and Desmond Harrison, London, England

Application June 16, 1953, Serial No. 362,096

Claims priority, application Great Britain June 16, 1952

9 Claims. (Cl. 219—27)

This invention relates to soldering tools of the kind comprising a non-fusible electrode to be electrically connected to one pole of an electric supply and having an operative end adapted to be placed in contact with a workpiece to be soldered, a second electrode to be electrically connected to the other pole of the supply and constituted of a rod, strip or wire of solder, and means for feeding the tip of the second electrode towards the operative end of the first electrode so that it also may be brought into contact with the workpiece, whereupon passage of current through the workpiece between the electrodes will generate sufficient heat to fuse the tip portion of the second or solder electrode.

It is an object of the present invention to provide an improved soldering tool of this kind which shall be capable of use when required for effecting unsoldering operations and which shall be relatively simple in construction and easy to operate.

According to the invention, a soldering tool of the kind referred to is provided with an additional non-fusible electrode displaceably mounted adjacent to the first non-fusible electrode and electrically connected to the same pole of the supply as the second or solder electrode, and with means whereby an operative end of the additional electrode may be brought into co-operating relation with the first electrode in the place of the tip of the solder electrode, when required.

Preferably, the first non-fusible electrode is tubular in form and lined internally with a sleeve of insulating material, the second and the additional electrodes being arranged so that the end or tip of either of them may be advanced through the sleeve when the other of them has been retracted out of the sleeve.

An example of a tool constructed in accordance with the invention is illustrated in the accompanying drawings, wherein:

Fig. 2 is a longitudinal section thereof taken on the line II—II of Fig. 3,

Figs. 3, 4 and 5 are transverse sections taken on the lines III—III, IV—IV and V—V, respectively, of Fig. 2, Figs. 4 and 5 being to a larger scale, and Fig. 6 is a fragmentary sectional side elevation, to a larger scale, showing a modified construction of a part of the tool shown in Fig. 1.

Figure 1:
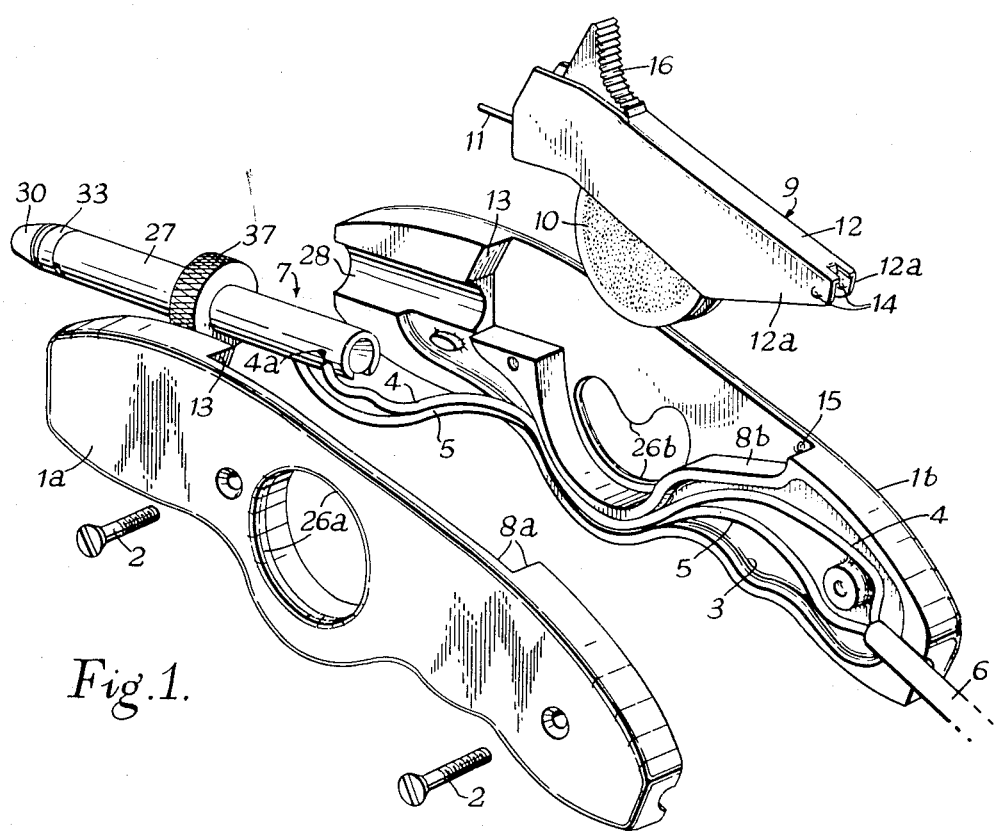
Fig. 1 is an exploded perspective view of the complete tool.

As shown in Figs. 1 to 5, the soldering tool comprises a handle of insulating material built up from two mouldings 1a and 1b held together by screws 2. The moulding 1b is formed with a recess 3 on its inner face in which are accommodated insulated electric leads 4 and 5 that are housed externally of the handle in a flexible cable 6 and are electrically connected to respective elements of an electrode assembly 7 at their free ends, as described below.

Each of the mouldings 1a and 1b is also formed with a recess 8a, or 8b, respectively, which has a longitudinally elongated upper part opening into the upper edge of the moulding and a narrower lower part with a wall of part-cylindrical shape. Within the slot or pocket formed by the recesses 8a and 8b in the assembled handle is adapted to be inserted a removable feed device 9 which is a close fit in the upper part of the pocket and co-operates with a reel or spool 10 on which is wound a length of solder wire 11 and which fits snugly by its lower part into the lower part of the pocket.

The feed device 9 comprises a channel-shaped metal pressing 12 having its flanges 12a shaped at their forward ends to engage beneath an undercut portion 13 of the wall of the pocket 8a, 8b and formed at their rearward ends with small domed protuberances 14 adapted to be sprung into engagement with corresponding dimples 15 (one only being visible in Fig. 1) in the bases of the respective recesses 8a and 8b. The forward end of the web of the channel 12 is cut away so that a finger-piece 16 may extend between the flanges, which latter are joined together at a lower point by a bridge piece 17 soldered in place. This bridge piece carries a rearwardly flared short guide tube 17a at its rear end and has a longitudinal guide channel 17b formed in its upper face to register with the lower part of the parallel-walled portion of the bore of the tube, this portion being slightly larger in diameter than the solder wire 11 and the channel 17b being of semi-circular cross-section with the diameter equal to that of the front end of the bore of the tube.

As can be seen from Fig. 2, the finger-piece 16 of the feed device is secured on the forward end of a strip 18 of springy metal, leaving a freely projecting sharpened end portion 18a, and this strip is resiliently clamped between the underside of the web of the channel 12 and a blade spring 19 so that it may slide longitudinally. The spring is secured to the web by means of a screw 20 which passes through a slot 21 in the strip 18, and the rear end of the latter carries a pillar 22 which extends through a slot 23 in the blade spring 19 to have engaged therewith the one end of a helical tension spring 24 which is anchored at its other end to a lug 25 on the rear end of the web of the channel 12.

The spool 10 is arranged to fit loosely between the flanges 12a of the channel 12 of the feed device and the leading end of the solder wire 11 is threaded through the tube 17a to lie in the channel 17b beneath the sharpened end 18a of the spring strip 18. It will be appreciated that when the finger-piece 16 is pressed forward and downward by the thumb of the user of the tool (to the position indicated in chain-dotted lines in Fig. 2), the end 18a of the strip 18 will indent the solder wire 11 supported on the bridge piece 17 until its edge meets the surface of this bridge piece, whereupon this edge will slide forwards over that surface and carry with it the solder wire. Release of the finger-piece allows the spring 24 to retract the strip 18 which also moves upwards somewhat under the action of the blade spring 19. Consequently, the solder wire 11 remains in the position to which it was advanced and subsequent operations of the finger-piece 16 will feed the wire forwards by predetermined short distances.

Should it be desired to wind back the wire 11 on to the spool 10, the operator or user grips the flanges of the spool by way of finger openings formed in the mouldings 1a and 1b and rotates the spool in the appropriate direction. The opening in the moulding 1a is circular and marked 26a while that in the moulding 1b is substantially semi-annular and marked 26b (see Fig. 1).

The electrode assembly 7, see Figs. 2, 4 and 5, comprises an outer metallic tube 27 which is clamped at its rear end between the mouldings 1a and 1b, these being appropriately grooved (as shown at 28 in Fig. 1 for the moulding 1b). The rear end of the tube 27 is disposed closely adjacent the forward end of the feed device 9 engaged in the pocket 8a, 8b. The front end of the tube 27 receives as a tight fit a spigot portion 29 of a non-fusible electrode 30 formed, for example, from carbon. The electrode is formed externally to a substantially frusto-conical shape and is traversed by an axial passage 31 which also passes through the spigot portion 29 and has secured therein a sleeve 32 of an insulating material, such as glass. The rear end of this sleeve has its mouth flared somewhat, as shown at 32a, and the front end of the sleeve terminates just short of the front end of the electrode 30. Although the spigot portion 29 may merely be pushed into the end of the tube 27, it is preferred to modify this end of the tube in the manner illustrated in Figs. 2 and 5 so that it will be easier to insert and withdraw the spigot while still ensuring satisfactory electrical contact between the same and the tube 27. For this purpose, the front end of the tube is formed with a circumferential groove and then has a substantially semi-cylindrical portion of its wall cut out to constitute a movable clamping element which is then replaced in its initial position, as shown at 27a in Figs. 2 and 5, while a split ring spring 33 is disposed in the circumferential groove to tend to force the clamping element 27a inwardly. When the spigot portion 29 is inserted into position, the clamping element 27a is forced outwards, against the action of the spring 33, to take up the position it occupied before being separated from the main body of the tube 27.

At the rear end of the electrode assembly 7, the tube 27 has engaged therein as a tight fit an insulating sleeve 34, within which is in turn secured a metallic guide tube 35 which extends axially of the outer tube 27 and has an internal diameter slightly larger than that of the solder wire 11. The rear ends of the sleeve 34 and tube 35 are formed with a flared mouth 35a so that the solder wire 11, when fed forward in the manner indicated above, may be smoothly guided into the tube 35. The forward end of the tube 35 is spaced by a short distance from the inner flared end 32a of the insulating sleeve 32.

In the lower part of the wall of the tube 27 there is formed a longitudinally extending slot 36 which extends from a location approximately opposite that of the front end of the tube 35 to the rear end of the tube 27. Mounted to slide on the exterior surface of the tube 27 is a knurled ring 37 of insulating material, to which is secured a non-fusible electrode 38, for example, of stainless steel, which is of rod-like form and of a cross-section such that it may readily pass through the sleeve 32 (provided that the solder wire 11 has been withdrawn therefrom). This electrode 38 is secured by its rear end to the inner face of the ring 37 by means of a screw 39, a distance piece 40 of insulating material being interposed between the electrode and the ring and shaped to be a sliding fit in the slot 36. The electrode 38 is narrower than the width of the slot 36 so that there is no possibility of electrical contact arising between the electrode and the tube 27. The screw 39 also serves to attach to the electrode 38 a spring clip 41 which embraces the outer surface of the tube 35 and may slide longitudinally thereon. As can be seen from Figure 2, the electrode 38 is curved somewhat in the longitudinal direction so that when the ring 37 is in the retracted position shown in full lines in Fig. 2 the front end of the electrode will bear on the corresponding end of the tube 35 and the tip of the electrode will be disposed just out of the path of the solder wire 11 as this is advanced, by the actuation of the feed device, from the tube 35 into the insulating sleeve 32. On the other hand, when the solder wire has been retracted to substantially the position shown in Fig. 2, sliding of the ring 37 forwards along the tube 27 to the position indicated in broken lines in Fig. 2 will introduce the end of the electrode 38 into the sleeve 32 and cause it to pass through the bore of the latter to project for a short distance beyond the tip of the carbon electrode 30, as also indicated in broken lines in Fig. 2.

The supply of electric current to the electrode assembly is effected through the leads 4 and 5, the former of which is soldered to the tube 27, as indicated at 4a in Fig. 1, and the latter of which is soldered to the guide tube 35, as indicated at 35b in Fig. 2. If desired, the forward end of the guide tube 35 may be slit longitudinally for a short distance, as indicated at 35c, in Fig. 2, and deformed inwards slightly in order to improve the electrical contact between the guide tube and the solder wire 11. It will be appreciated that when the leads 4 and 5 are connected at their other ends to a supply of electric current, for example, to the low voltage secondary winding of a transformer or to the terminals of an electric battery or accumulator, the solder wire is electrically connected to one pole of the source of supply and the non-fusible electrode 30 is electrically connected to the other pole of this source. Moreover, the additional non-fusible electrode 38 is also electrically connected to that pole to which the solder wire 11 is connected.

A slight modification of the electrode assembly 7 is illustrated in Fig. 6, where the same reference numerals are employed to indicate parts corresponding to those shown in Fig. 2. In this case the guide tube 35 is slit longitudinally at its underside from its forward end back to the corresponding end of the insulating sleeve 34. The walls of the tube 35 at either side of the slit are bent outwards and somewhat away from each other to constitute lips 35d, which together define a guide channel of inverted V-shape in cross-section. This channel serves to guide the additional non-fusible electrode 38 and to connect it electrically to the tube 35. The excellence of the electrical connection is improved by crimping and slightly flattening the forward end of the tube 35, as shown at 35e, to deform it into spring contact tongues which lightly grip both the solder wire 11 and the electrode 38.

In the use of the soldering tool described, soldering operations are performed with the additional non-fusible electrode 38 in its retracted position, shown in full lines in Fig. 2. The solder wire 11 is is advanced by operation of the feed device 9 until its free end projects through the non-fusible electrode 30 to a sufficient distance to ensure that when the operative end of the electrode 30 is applied to a workpiece, such as is indicated by the chain-dotted line 42 in Fig. 2, the tip of the solder wire will also be in contact with this workpiece. The flow of current through the workpiece, between the fusible electrode constituted by the wire 11 and the non-fusible electrode 30, generates heat in the workpiece which rapidly becomes sufficient to melt the tip portion of the solder wire. As will be appreciated, solder wire may be fed to the working location as and when required by actuation of the feed device 9.

Should it be desired to effect an unsoldering operation, the solder wire 11 is retracted from the electrode 30 by winding the wire back on to the spool 10. When the end of the wire is in a position such as that indicated in Fig. 2, the ring 37 is moved to its forward position to cause the additional non-fusible electrode 38 to pass through the bore of the insulating sleeve 32 and to project beyond the operative end of the electrode 30 to an extent equivalent to that to which the solder wire 11 projected during the soldering operation. In this case current will flow between the two non-fusible electrodes through the workpiece and generate sufficient heat in the latter to fuse any solder thereon.

What we claim is:

1. In an electric hand tool comprising a tubular non-fusible work-engaging electrode connected to one pole of an electric supply and lined with an insulating sleeve through which a solder electrode connected to the other pole of said supply may be advanced into contact with the work in order to cause electric current to flow through the latter and generate sufficient heat to melt solder in contact therewith, means for retracting said solder electrode from said tubular electrode, an auxiliary non-fusible electrode connected to said other pole of the supply and normally disposed in a position out of the path of said solder electrode, means for guiding said auxiliary electrode along a path leading into said sleeve, and means for displacing said auxiliary electrode along said path from its normal position to a position in which it extends through said sleeve into contact with the work in order to cause electric current to flow through the latter and generate sufficient heat to melt solder thereon.

2. In an electric hand tool for effecting soldering operations and comprising a tubular non-fusible work-engaging electrode lined with an insulating sleeve through which a solder electrode may be advanced into contact with the work, the tubular electrode and the solder electrode being electrically connected to respective poles of a source of electric current, means adapting said tool for effecting unsoldering operations comprising means for retracting said solder electrode from said tubular electrode, a displaceable auxiliary non-fusible electrode electrically connected to said solder electrode and normally disposed out of the path of movement of said solder electrode, means for guiding said auxiliary electrode during displacement thereof so that it will follow a path terminating in the passage through said insulating sleeve, and means for displacing said auxiliary electrode between its normal position and a position in which it extends through said tubular electrode into contact with the work.

3. In an electric hand tool for effecting soldering operations and comprising a tubular non-fusible work-engaging electrode lined with an insulating sleeve through which a solder electrode may be advanced into contact with the work, the tubular electrode and the solder electrode being electrically connected to respective poles of a source of electric current, means adapting said tool for effecting unsoldering operations comprising a device for retracting said solder electrode from said tubular electrode, a displaceable auxiliary non-fusible electrode electrically connected to said solder electrode, means for guiding said auxiliary electrode in a path passing through said insulating sleeve, and means for displacing said auxiliary electrode along said path so that it may be brought into contact with the work and retracted therefrom when required.

4. In an electric hand tool for effecting soldering operations and comprising a tubular non-fusible work-engaging electrode lined with an insulating sleeve through which a solder electrode may be advanced into contact with the work, the tubular electrode and the solder electrode being electrically connected to respective poles of a source of electric current, means adapting said tool for effecting unsoldering operations comprising means for retracting said solder electrode from said tubular electrode, an auxiliary non-fusible electrode electrically connected to said solder electrode, means for guiding said auxiliary electrode into the passage through said insulating sleeve and means for advancing said auxiliary electrode through, and retracting it from, said tubular electrode.

5. An electric hand tool for effecting soldering and unsoldering operations comprising individually displaceable first and second rod-form electrodes both connected to one pole of a source of electric current and adapted to be brought alternatively into co-operating relation with a non-displaceable tubular work-engaging third electrode connected to the other pole of said source, an insulating sleeve lining said third electrode and having a passage therethrough of a size to permit either of the rod-form electrodes to pass thereinto, said first electrode being of solder and said second electrode being of non-fusible material, means engaging said first electrode for guiding it into the passage through said sleeve, means engaging said second electrode for guiding it in to said passage, means for advancing said first electrode through said third electrode into contact with the work for effecting a soldering operation, means for retracting said first electrode from said third electrode, and means operable while said first electrode is retracted for advancing said second electrode through said third electrode into contact with the work for effecting an unsoldering operation.

6. An electric hand tool for effecting soldering and unsoldering operations comprising individually displaceable first and second electrodes both connected to one pole of a source of electric current and adapted to be brought alternatively into co-operating relation with a non-displaceable tubular third electrode connected to the other pole of said source, an insulating sleeve lining said third electrode, guiding means spaced from said third electrode and adapted to direct said first electrode into the passage through said sleeve, further guiding means adapted to direct said second electrode in a path passing through the space between said first-mentioned guiding means and said third electrode and into the passage through said sleeve, means for advancing said first electrode through said first-mentioned guiding means in the direction of said third electrode, means for retracting said first electrode from said third electrode into said first-mentioned guiding means, and means operable for advancing and retracting said second electrode along said path towards and away from, respectively, said third electrode, said first electrode being composed of a solder rod of a cross-section slightly smaller than that of the passage through said sleeve and said second electrode being composed of a non-fusible rod similar in cross-section to said solder rod.

7. An electric hand tool for effecting soldering and unsoldering operations comprising individually displaceable first and second electrodes both connected to one pole of a source of electric current and adapted to be brought alternatively into co-operating relation with a non-displaceable tubular third electrode connected to the other pole of said source, an insulating sleeve lining said third electrode, means for guiding said first electrode into the passage through said sleeve, means for guiding said second electrode into said passage, means for advancing said first electrode in the direction of said third electrode, means for retracting said first electrode from said third electrode, and means operable for advancing and retracting said second electrode towards and away from, respectively, said third electrode, said first electrode being composed of a solder rod of a cross-section slightly smaller than that of the passage through said sleeve, and said second electrode being composed of a non-fusible rod similar in cross-section to said solder rod.

8. An electric hand tool for effecting soldering and unsoldering operations comprising a holder adapted to be held in the hand, a tubular non-fusible electrode detachably mounted on the forward end of said holder, an insulating sleeve disposed within said electrode, an electrically conducting element disposed within said holder and electrically insulated from said tubular electrode, a guide passage in said element aligned with the passage through said sleeve, an elongated fusible solder electrode threaded through said guide passage and having a cross-section such that it can pass as a relatively close fit into said sleeve, means on said holder for advancing said solder electrode to displace an end thereof through said sleeve in said tubular electrode so that both the latter and said end may be simultaneously engaged with a workpiece, means for retracting said end of the solder electrode into said guide passage, an elongated non-fusible electrode disposed within said holder in electrical connection with said element and of a cross-section such that it can pass as a relatively close fit into said sleeve, means for guiding said elongated non-fusible electrode into said sleeve, means for advancing said elongated non-fusible electrode to displace its end through said sleeve so that both the tubular electrode and said end may be simultaneously engaged with the work-piece, an electrical connection from one pole of a source of electric current to said tubular electrode, and an electrical connection from another pole of said source to said element, the simultaneous engagement with the work-piece of the tubular electrode and the appropriate one of said ends causing current to flow through said work-piece and generate sufficient heat therein to melt a body of solder in contact therewith.

9. An electric hand tool for effecting soldering and unsoldering operations comprising a holder adapted to be held in the hand, a tubular forward extension of electrically conducting material mounted on said holder, a tubular non-fusible electrode detachably mounted on the forward end of said extension, an insulating sleeve disposed within said electrode, an electrically conducting element disposed coaxially within but electrically insulated from said tubular extension, a guide passage in said element aligned with the passage through said sleeve, an elongated fusible solder electrode threaded through said guide passage and having a cross-section such that it can pass as a relatively close fit into said sleeve, means for advancing said solder electrode to displace an end thereof through the sleeve in said tubular electrode so that both the latter and said end may be simultaneously engaged with a work-piece, means for retracting said end of the solder electrode into said guide passage, an elongated non-fusible electrode disposed within said tubular extension in electrical connection with said element but insulated from said extension and having a cross-section such that it can pass as a relatively close fit into said sleeve, means for guiding said elongated non-fusible electrode into said sleeve, means for advancing said elongated non-fusible electrode to displace its end through said sleeve so that both the tubular electrode and said end may be simultaneously engaged with the work-piece, an electrical connection from one pole of a source of electric current to said forward extension and an electrical connection from another pole of said source to said element, the simultaneous engagement with the work-piece of the tubular electrode and the appropriate one of said ends causing current to flow through said work-piece and generate sufficient heat therein to melt a body of solder in contact therewith.

References Cited in the file of this patent

UNITED STATES PATENTS

| | | |
|---|---|---|
| 1,287,448 | Ryden | Dec. 10, 1918 |
| 1,893,093 | Linville et al. | Jan. 3, 1933 |
| 2,210,352 | Albietz | Aug. 6, 1940 |
| 2,517,561 | Handley | Aug. 8, 1950 |
| 2,605,379 | McKay | July 29, 1952 |
| 2,689,901 | Obolensky | Sept. 21, 1954 |